United States Patent [19]

Knights

[11] 3,939,524

[45] Feb. 24, 1976

[54] WINDSCREEN WIPERS

[76] Inventor: Robert Edgar Knights, 180, Park Farm Drive, Allestree, Derbyshire, England

[22] Filed: Oct. 30, 1972

[21] Appl. No.: 301,736

[30] Foreign Application Priority Data

Nov. 2, 1971 United Kingdom............... 50931/71

[52] U.S. Cl. .......... 15/250.04; 15/250.07; 15/250.2; 15/250.36; 15/250.41; 15/250.42
[51] Int. Cl. ............................ B60s 1/52; B60s 1/38
[58] Field of Search ..................... 15/250.01–250.11, 250.20–250.22, 250.36–250.42

[56] References Cited
UNITED STATES PATENTS

| | | | |
|---|---|---|---|
| 1,683,053 | 9/1928 | Pisciotta ........................... | 15/250.04 |
| 2,273,817 | 2/1942 | Chellew ............................ | 15/250.35 |
| 2,354,440 | 7/1944 | Brown............................... | 15/250.41 X |
| 2,794,203 | 6/1957 | Oishei .............................. | 15/250.2 UX |
| 2,925,617 | 2/1960 | Williams .......................... | 15/250.4 X |
| 3,037,233 | 6/1962 | Peras et al. ..................... | 15/250.36 X |
| 3,138,816 | 6/1964 | Abodeely.......................... | 15/250.41 |

FOREIGN PATENTS OR APPLICATIONS 1,058,381   5/1959   Germany ......................... 15/250.02

Primary Examiner—Peter Feldman
Attorney, Agent, or Firm—Marn & Jangarathis

[57] ABSTRACT

A windscreen wiper comprising a reciprocable arm, a flexible blade element mounted on the arm and including a pair of flexible wall members terminating in generally parallel spaced lip members adapted to engage a windscreen surface so that the blade element encloses therewith a hollow space, at least one conduit for cleaning liquid extending along the arm and communicating with the hollow space whereby cleaning liquids may be fed to the surface of the windscreen between the lips, and a flexible brush or assembly of brushes mounted in the said hollow space so as to bear on the surface of the windscreen between the lips and to be slidably engaged therewith during the wiping action.

11 Claims, 8 Drawing Figures

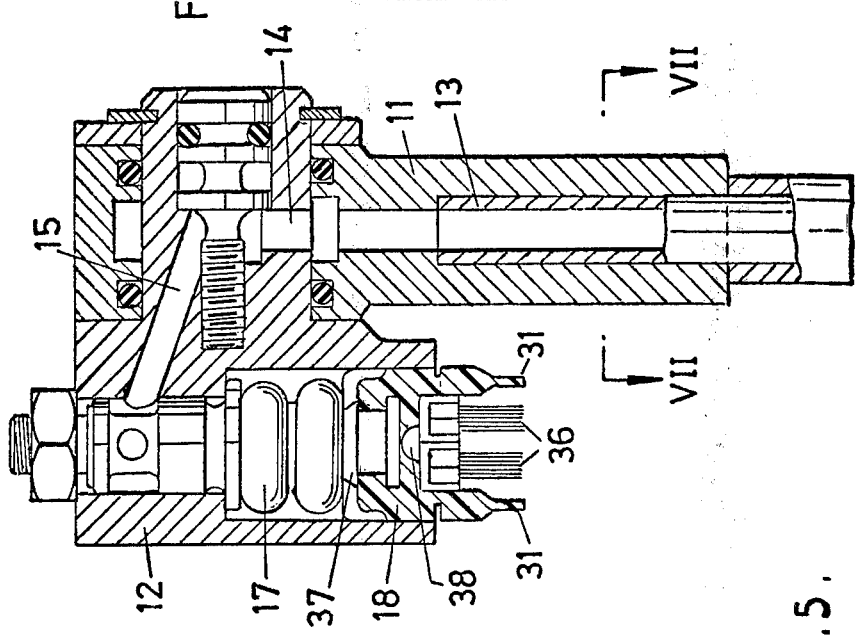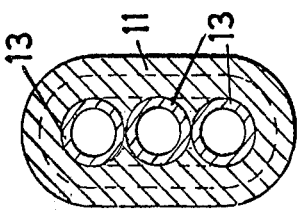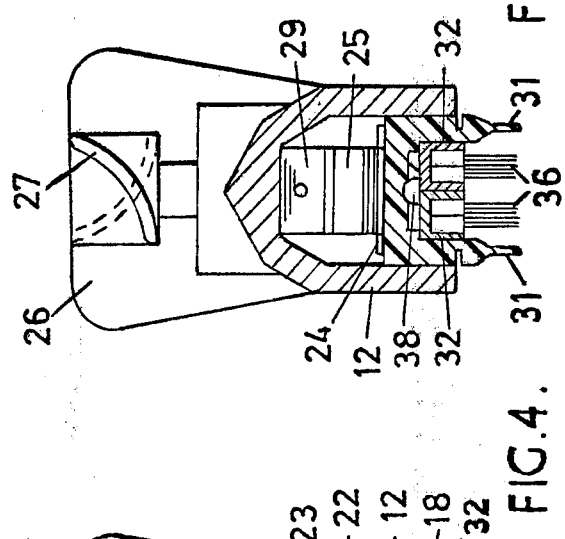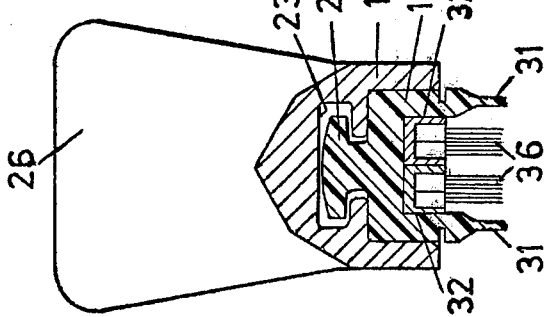

WINDSCREEN WIPERS

This invention relates to windscreen wipers, particularly, but not solely, for motor vehicles.

The conventional windscreen wiper has a single flexible blade which has to feather at the beginning of each half stroke. Such blades have been in use for many years but they suffer from a number of drawbacks, particularly:

a. They are only effective when operating under ideal environmental conditions.

b. They cannot quickly remove oil slick residual on the windshield after muddy deposits, thrown up by other road vehicles, have been swept aside.

c. They are unable to remove greasy deposits which collect in the small windshield pits produced during collision with stones etc. thrown up by other vehicles. These deposits engender prevalent smears which, at worse cause a dangerous loss of vision area, or, at best, render driving uncomfortable.

d. This type of equipment can only be assisted to combat these shortcomings by means of water jets directed onto the windshield surface. Degreasing liquids or detergent fluids introduced into such water jets are largely wasted due to the liquid being immediately swept out of the wiper blade swept area, or by being deflected away from the windshield by crosswinds immediately after ejection from the jet nozzles.

e. This type of wiper blade depends upon an automatically induced feathering action in order to provide a clean wiping action during each of the dual directional wiping sweeps. Nominal pivotal point wear or accidental displacement of the blade carrier driven radius arm often causes the feathering action to cease.

f. Conditions during cold weather can cause a sudden ice film to be built up on the vital visibility area of the swept windshield.

Various proposal have been made to produce wiper arrangements with twin wiper lips having some sort of brush in between. For instance, in one proposal particularly designed for aircraft, a pair of rotary brushes were arranged between a pair of wiper lips, and a feed pipe for cleaning liquid was also arranged between the lips. This arrangement appears to be too complex and expensive to be economically used on a motor vehicle, which also does not have the necessary degree of flexibility for use on a conventional curved windscreen. In particular, there is no suitable flexible rotatable brush available which could be used at an economic price.

In the motor vehicle field, it has been proposed to use a wiping or scrubbing type of brush between two conventional squeegee type wiping lips, but this arrangement suffered from the disadvantages that it needed to be used with a conventional washer equipment and the blade would tend to prevent the brush from acting on a surface with cleaning fluid on it.

The present invention consists in a windscreen wiper comprising a reciprocable arm, a flexible blade element mounted on the arm and including a pair of flexible wall members terminating in generally parallel spaced lip members adapted to engage a windscreen surface so that the blade element encloses therewith a hollow space, at least one conduit for cleaning liquid extending along the arm and communicating with the hollow space whereby cleaning liquids may be fed to the surface of the windscreen between the lips, and a flexible brush or assembly of brushes mounted on the said hollow space so as to bear on the surface of the windscreen between the lips and to be slidably engaged therewith during the wiping action.

The arm may contain conduits for more than one cleaning fluid, such as a de-icing fluid, a wetting agent or detergent, and clean water for rinsing.

Conveniently, the assembly of brushes comprises at least two elongated flexible brush carriers each carrying a series of spaced bursh lengths, the brush lengths in adjacent carriers being mutually staggered.

The brush carriers may partially define a feed cavity for cleaning liquid within the hollow space, and in which liquid from the said cavity is arranged to pass through a restricted passage between the brush carriers on to the windscreen surface in the region of the said brushes.

Means may be provided for counteracting wind lift effects on the blade element.

The invention further consists in a windscreen wiper comprising a reciprocable arm, a blade carrier pivotally mounted on the said arm, a flexible blade element mounted on the carrier by means of variable rate spring means, and wind-responsive means adapted to vary the rate of the said spring means to counteract wind lift effects on the blade element.

The invention will be further described with reference to the accompanying drawings, which show by way of example a preferred embodiment of invention, and in which:

FIG. 4 is a section on the line IV—IV of FIG. 3;

FIG. 5 is a section on the line V—V of FIG. 3;

FIG. 6 is a section on the line VI—VI of FIG. 3;

FIG. 7 is a section on the line VII—VII of FIG. 6; and

FIG. 8 is a longitudinal section of a detail of FIG. 3.

Figure 1:
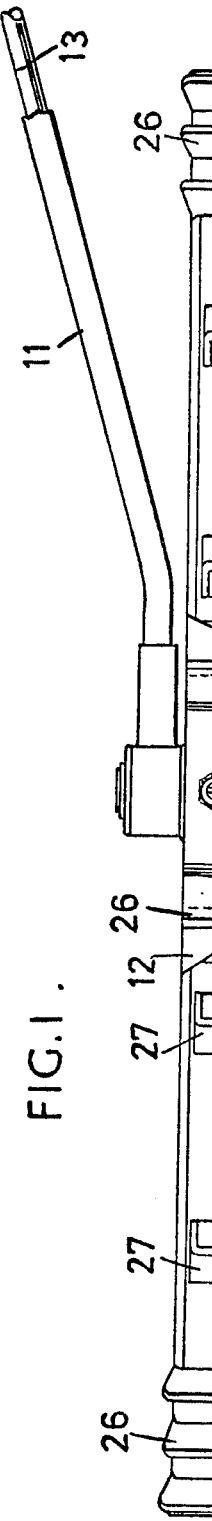
FIG. 1 is a plan view of one form of windshield wiper according to the invention.

Referring now to the drawings, a reciprocable arm is shown at 11 and it has one end pivotally attached to a blade carrier 12. The other end (not shown) is adapted to be attached to the drive output of a conventional windscreen wiper motor. As can be seen particularly from FIG. 7, the arm 11 includes tubular conduits 13 for three cleaning liquids, which would normally be a de-icer, a degreaser, wetting agent or detergent and clean water. The cleaning liquids are supplied from separate reservoirs by driver-controlled pumps. The connection between the arm 11 and the carrier 12 includes a manifold 14 connected to a duct 15 leading to a passage 16, including a flexible boot 17, for the cleaning liquids.

A blade element 18, of generally U-shaped cross-section, is secured at a central zone of the carrier 12 by pins 19 passing through upstanding lugs 21, and is retained to end zones of the carrier 12 by co-operation of a T-shaped head 22 with a slot 23 in the carrier (see FIG. 4). The blade element 18 also has a pair of backing strips 24 which are pressed upon by springs 25.

In order to counteract the wind lift effects which occur at high vehicle speeds or high wind speeds, the carrier 12 is provided with static vanes 26 intended to hold the assembly of carrier and blade element against the windscreen when the wind lift tends to cause it to move clear. In addition, in order to prevent the blade element 18 from lifting relative to the carrier 12, means are provided to increase the rate of the springs 25.

These consist of rotary vanes 27 on shafts with coarsely threaded parts 28 co-operating with coarse threads in apertures in the carrier 12. The shafts carry curved spring abutments 29, which engage with increasing lengths of the springs 25 as the shaft move inwards against the force of the spring 25, thus effectively shortening the springs 25 and stiffening them to resist wind lift forces tending to move the blade element 18 relative to the carrier 12.

Figure 2:
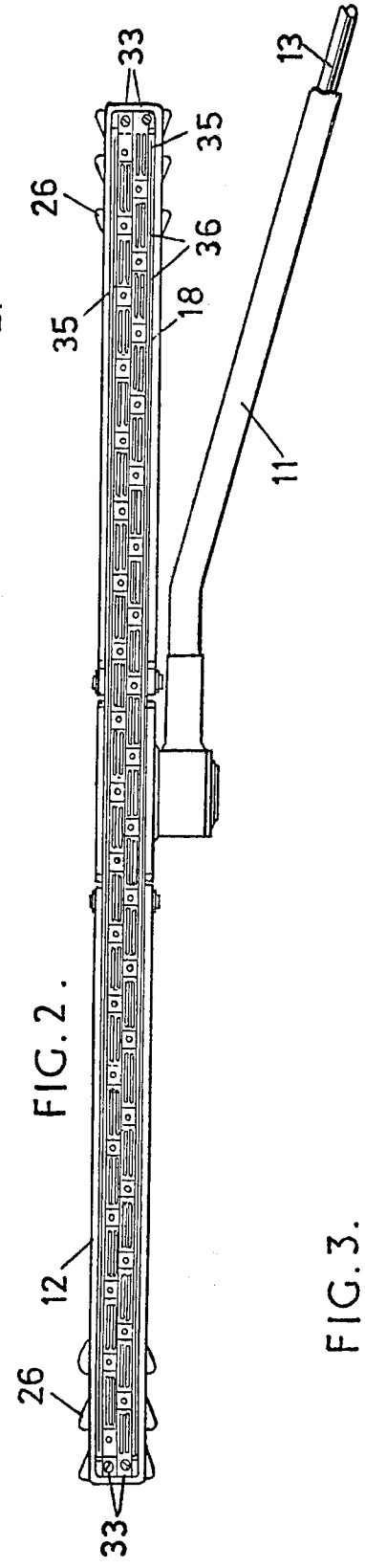
FIG. 2 is a bottom plan view of the wiper of FIG. 1.

As can be seen particularly from FIGS. 4 and 5, the blade element 18 is of generally U-shaped section so as to enclose a hollow space above the screen to be wiped. The ends of this U-section are in the form of a pair of squeegee lips 31. The zone of the screen between the squeegee lips 31 is engaged in wiping or scrubbing contact with a brush assembly which consists of two flexible brush carriers 32, of the type shown in FIG. 8, arranged side-by-side and attached to the carrier 12 by screws 33. Each brush carrier 32 consists of a strip of polypropylene or like plastics material with loop zones 34 intermediate the ends to accommodate changes in the effective length as the carrier 12 flexes. The strip carries a series of pockets 35 equally spaced along its length, with the end pockets 35 at different distances from the ends of the strip so that when, as seen in FIG. 2, two strips are arranged side-by-side and reversed end-to-end, the pockets form staggered lines. Each pocket 35 is filled with a short length of brush material 36.

Figure 3:
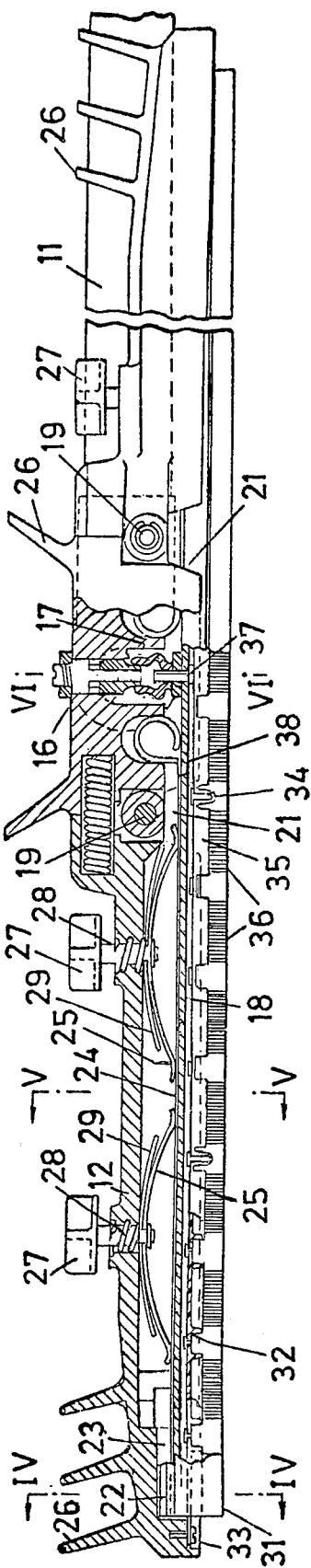
FIG. 3 is an elevation, partially cut away and in section, to an enlarged scale of the wiper of FIGS. 1 and 2.

As can be seen from FIGS. 3, 5 and 6, the passage 16 leads by a connection 37 into a cavity 38 within the blade element 18 and above the brush carriers 32, which are located closely together, so that there is a restricted flow passage between them to the screen zone between the lips 31. This means that the cleaning liquids can remain under considerable pressure in the cavity 38 and becomes distributed along the length of the blade element 18 before passing onto the screen surface to be cleaned. The liquids are thus directed to the correct zone of the screen with very little waste, and a reasonable distribution over the zone between the lips 31 of the blade element.

Various modifications may be made within the scope of the invention. For example, the arm 11 need not carry a separate conduit 13 for each type of cleaning liquid, and it is within the invention for there to be a single conduit 13 fed either with a single cleaning liquid, or with any of a selected group of cleaning liquids available from separate reservoirs.

Also, the rotary vanes 27 may be replaced by vanes mounted on pivoted or rotary elements connected by a linkage to means for varying the rating of the springs such as 25.

What I claim is:

1. A windscreen wiper comprising:
   a reciprocable arm;
   a flexible blade element mounted on the arm and including a pair of flexible wall members terminating in generally parallel spaced lip members adapted to engage a windscreen surface, said lip members forming a hollow space therebetween, said blade element including at least one conduit means extending along the arm and communicating with said hollow space whereby a cleaning liquid may be passed through said conduit to contact said windscreen surface; and
   a flexible brush means mounted within said hollow space to bear on said windscreen surface between the lips of said blade element and to slidably engage said surface during a wiping action, said flexible brush means being comprised of at least to elongated flexible brush carriers including brush means of spaced brush lengths, the brush lengths in adjacent carriers being staggered.

2. A windscreen wiper as claimed in claim 1, in which the arm contains separate conduits for different cleaning fluids.

3. A windscreen wiper as claimed in claim 1, in which each brush carrier includes a series of spaced recesses for receiving the brush lengths.

4. A windscreen wiper as claimed in claim 1 in which which the brush carriers partially define a feed cavity for cleaning liquid within the hollow space, and in which liquid from the said cavity is arranged to pass through a restricted passage between the brush carriers on to the windscreen surface in the region of the said brushes.

5. A windscreen wiper as claimed in claim 1, in which the blade element is carried by a blade carrier pivoted on the arm, and carrying vanes to counteract wind lift on the carrier.

6. A windscrene wiper as claimed in claim 5, further comprising wind-responsive means acting on the mounting of the blade element to increase the pressure exerted by the carrier on the blade element to counteract wind lift.

7. A windscreen wiper as claimed in claim 6, in which the blade element is mounted on the carrier by variable rate spring means, and said wind-responsive means acts to vary the rate of the said spring means.

8. A windscreen wiper as claimed in claim 7, in which the wind-responsive means comprises rotary vanes adapted to adjust the positions of spring abutments for the said spring means.

9. A windscreen wiper comprising a reciprocable arm a blade carrier pivotally mounted on the said arm, a flexible blade element mounted on the carrier by means of variable rate springs means, and wind-responsive means adapted to vary the rate of the said spring means to counteract wind lift effects on the blade element.

10. A windscreen wiper as claimed in claim 9, in which the wind-responsive means comprises rotary vanes adapted to adjust the positions of spring abutments for the said spring means.

11. A windscreewn wiper as claimed in claim 9, in which the carrier includes static vanes to counteract wind lift effects on the carrier itself.

* * * * *